United States Patent [19]
Ikebe et al.

[11] Patent Number: 5,881,871
[45] Date of Patent: Mar. 16, 1999

[54] CARTRIDGE RECEIVING CASING

[75] Inventors: Masaru Ikebe; Satoru Kurokawa, both of Nagano, Japan

[73] Assignee: TDK Corporation, Japan

[21] Appl. No.: 74,100

[22] Filed: May 7, 1998

[30] Foreign Application Priority Data

May 8, 1997 [JP] Japan ..................................... 9-133026

[51] Int. Cl.$^6$ .............................................. G11B 23/023
[52] U.S. Cl. .................................... 206/308.1; 206/308.3; 206/313
[58] Field of Search .................................... 206/307, 309, 206/310, 311, 312, 313, 308.1, 308.3, 1.5

[56] References Cited

U.S. PATENT DOCUMENTS

| | | | |
|---|---|---|---|
| 5,385,235 | 1/1995 | Ikebe et al. | 206/308.3 |
| 5,450,952 | 9/1995 | Funawatari et al. | 206/308.3 |

FOREIGN PATENT DOCUMENTS

| | | |
|---|---|---|
| 0 493 845 A2 | 7/1992 | European Pat. Off. . |
| 06-293377 | 10/1994 | Japan . |

*Primary Examiner*—Jacob K. Ackun
*Attorney, Agent, or Firm*—Lerner, David, Littenberg, Krumholz & Mentlik

[57] ABSTRACT

A cartridge receiving casing capable of facilitating inserting of a cartridge into the casing and taking out of the same therefrom. The casing includes an upper casing member and a lower casing member and is provided at a front portion thereof with an access opening for inserting the cartridge into or taking it out of an interior of the casing. The casing also includes holders for holding the cartridge in the casing. The upper casing member is provided with an opening through which an operation of taking the cartridge out of the casing is carried out. The lower casing member is provided on a portion of an inner surface thereof opposite to the opening with a roughened surface section.

21 Claims, 3 Drawing Sheets

F I G. 2
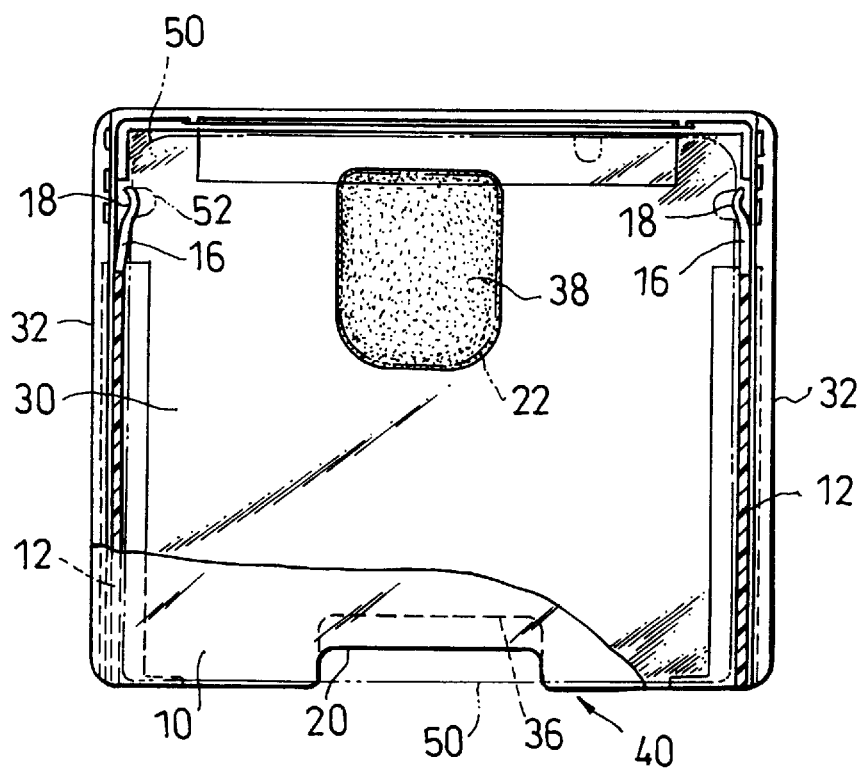
F I G. 3
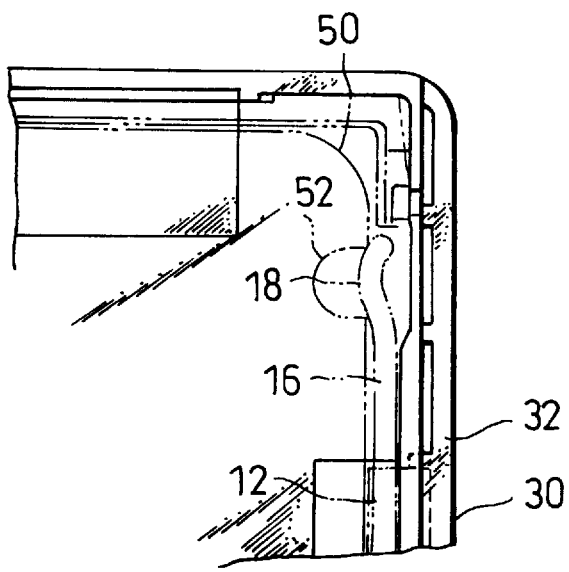

CARTRIDGE RECEIVING CASING

BACKGROUND OF THE INVENTION

This invention relates to a cartridge receiving casing, and more particularly to a cartridge receiving casing used for transporting or storing a disc cartridge including a disc-like medium such as, for example, an optical disc, a magneto-optical disc or a floppy disc; a tape cartridge including a tape-like medium such as, for example, a DAT or a digital compact cartridge (DCC); or the like while receiving it therein.

In general, a cartridge is transported, stored or sold while being housed or received in a cartridge receiving casing. A cartridge receiving casing used for this purpose is constituted by an upper casing member and a lower casing member joined to each other and provided on one side thereof with an access opening through which the cartridge is inserted into or taken out of an interior of the casing.

Also, such a conventional cartridge receiving casing is provided therein with a holder or holders for holding the cartridge in the casing to prevent it from falling off from the casing.

Unfortunately, the cartridge receiving casing fails to permit the cartridge to be readily taken out of the casing once the cartridge is received in the casing.

A cartridge receiving casing which is constructed so as to solve the problem is proposed as disclosed in Japanese patent Application Laid-Open Publication No. 279484/1992. More particularly, the cartridge receiving casing proposed is so constructed that the casing is provided with an opening through which an operation of taking a cartridge out of the casing is carried out. The cartridge is forced by a finger inserted through the opening, to thereby be removed from the casing.

The proposed cartridge receiving casing facilitates removal of the cartridge therefrom, however, it causes damage to both an inner surface of the casing and the cartridge due to friction between the cartridge and the casing because the cartridge is forced through the opening during removal of the cartridge from the casing.

Also, the cartridge is caused to be pressedly contacted with the inner surface of the casing depending on the manner of forcing the cartridge through the opening, so that removal of the cartridge from the casing is failed.

SUMMARY OF THE INVENTION

The present invention has been made in view of the foregoing disadvantages of the prior art.

Accordingly, it is an object of the present invention to provide a cartridge receiving casing which is capable of significantly facilitating taking-out or removal of a cartridge from the casing.

In accordance with the present invention, a cartridge receiving casing is provided. The cartridge receiving casing includes an upper casing member and a lower casing member joined to each other. The upper and lower casing members are constructed so as to provide the casing with an access opening through which a cartridge is inserted into or taken out of the casing when the casing members are joined to each other. The cartridge receiving casing also includes holders for holding the cartridge in the casing once the cartridge is received therein. One of the upper and lower casing members is formed with an opening through which an operation of taking the cartridge out of the casing is carried out and the other of the upper and lower casing members is provided on at least a portion of an inner surface thereof opposite to the opening with a roughened surface section.

In the cartridge receiving casing of the present invention thus constructed, when the cartridge is received in the casing, it is held therein due to engagement between the holders and the cartridge. When the cartridge received in the casing is forced by a finger inserted through the opening for the purpose of taking out or removing the cartridge from the casing, a surface of the cartridge opposite to that pressed by the finger is slid on the roughened surface section of the inner surface of the casing. This effectively reduces friction between the cartridge and the casing during sliding of the cartridge, to thereby ensure smooth removal or taking-out of the cartridge from the casing.

In a preferred embodiment of the present invention, the opening is provided at the upper casing member.

In a preferred embodiment of the present invention, the roughened surface section is provided all over an inner bottom surface of the lower casing member.

In a preferred embodiment of the present invention, the roughened surface section is formed with a ten-point average roughness of 5 to 15 $\mu$m as measured in accordance with JIS B 0601.

In a preferred embodiment of the present invention, the upper casing member is made of a transparent resin material.

In a preferred embodiment of the present invention, the holders are each formed integrally with one of the upper and lower casing members. Alternatively, the holders are each formed separately from the upper and lower casing members and mounted on one of the upper and lower casing members.

In a preferred embodiment of the present invention, the opening is of a size which permits a finger to enter the opening.

In a preferred embodiment of the present invention, the access opening is formed with cutouts to permit an outer periphery of the cartridge to be exposed therefrom.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate like or corresponding parts throughout; wherein:

FIG. 2 is partly cutaway plan view of the cartridge receiving casing shown in FIG. 1;

FIG. 3 is a fragmentary enlarged plan view of a lower casing member of the cartridge receiving casing shown in FIG. 1.

DETAILED DESCRIPTION OF THE PREFERRED EMBODIMENTS

Now, a cartridge receiving casing according to the present invention will be described hereinafter with reference to the accompanying drawings.

Figure 1:
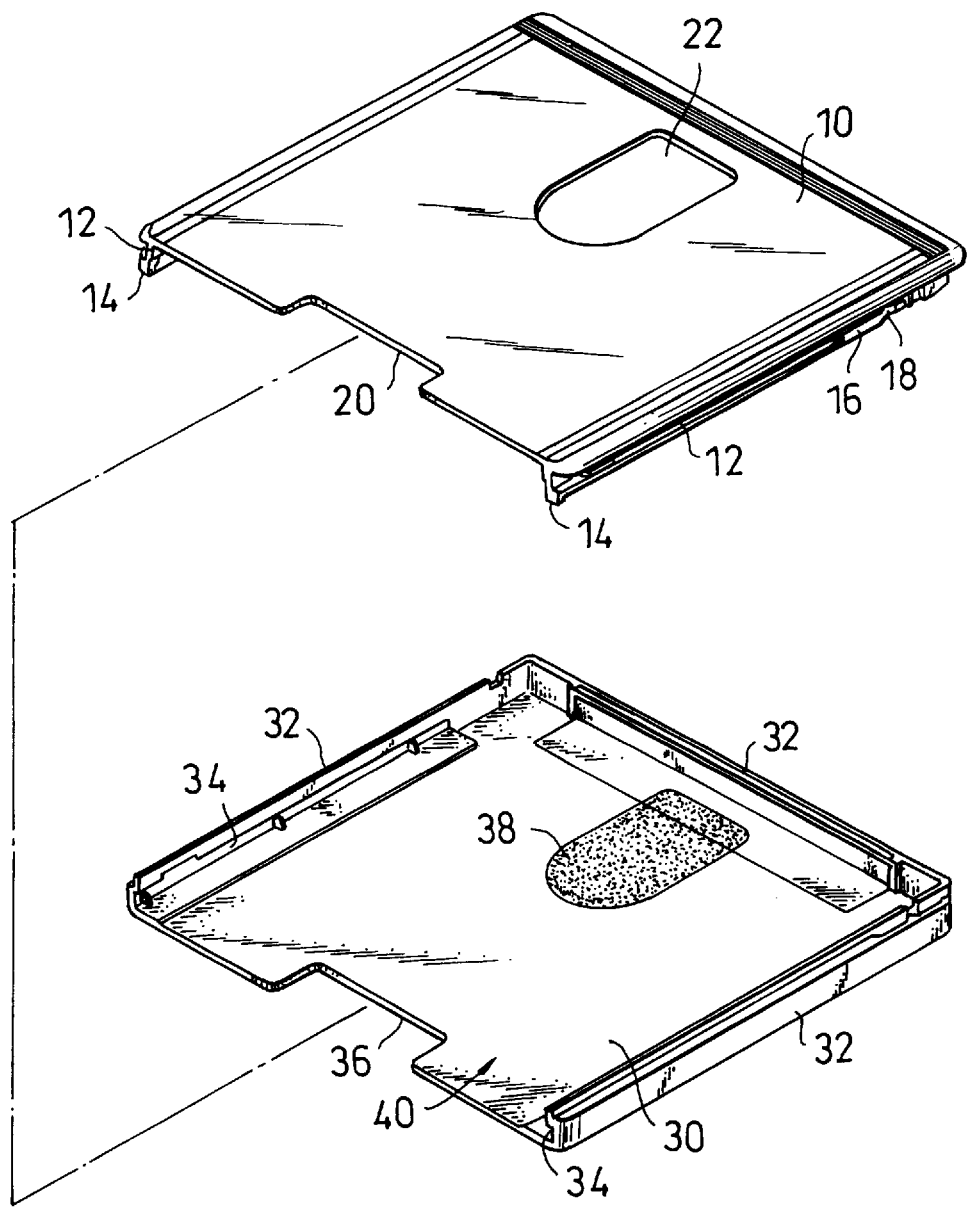
FIG. 1 an exploded perspective view showing an embodiment of a cartridge receiving casing according to the present inventions.

Referring first to FIGS. 1 to 3, an embodiment of a cartridge receiving casing according to the present invention is illustrated. A cartridge receiving casing of the illustrated embodiment generally includes an upper casing member 10 and a lower casing member 30 fittedly joined to each other. The upper casing member 10 acts as a cover of the casing and may be made of a transparent resin material. The lower casing member 30 acts as a base of the casing and may be made of an opaque resin material. The upper casing member 10 has two side walls 12 arranged opposite to each other, each of which is provided thereon with a rail-like projection 14. The lower casing member 30 has two side walls 32 arranged opposite to each other and a rear side wall 32. The opposite side walls 32 of the lower casing member 30 are each provided with a recess or groove 34 in which a corresponding one of the projections 14 of the upper casing member 10 is fitted. Fitting or engagement between the projections 14 and the recesses 34 permits the upper casing member 10 and the lower casing member 30 to be joined to each other, to thereby provide the casing.

In the illustrated embodiment, the upper and lower casing members 10 and 30 are substantially free of any front side wall, so that joining between the upper casing member 10 and the lower casing member 30 permits the casing thus formed to be provided at a front end portion thereof with an access opening 40 through which insertion of a cartridge 50 into the casing or removal of the same therefrom is carried out. In this instance, an MD (mini disc) is illustrated as an example of the cartridge.

The upper casing member 10, as shown in FIGS. 2 and 3, is provided on each of the opposite side walls 12 thereof on which the projection 14 is formed with an elastically deformable arm 16 in a manner to be integral with the side wall 12. The arms 16 are each provided at a distal end thereof with a claw-like holder 18. Correspondingly, the cartridge 50 is provided with recesses 52, in which the respective holders 18 of the cartridge receiving casing is fittedly held.

The upper casing member 10 and lower casing member 30 are provided at the front portions thereof defining the access opening 40 with respective cutouts 20 and 36 of a substantially recess-like shape. The cutouts 20 and 36 act to permit the cartridge 50 to be readily caught by fingers when it is taken out of the casing, to thereby facilitate taking-out or removal of the cartridge 50 from the casing.

Also, the upper casing member 10 is formed with an opening 22 through which the cartridge 50 is pushed or forced by a finger, to thereby be slid in the casing, resulting in facilitating taking of the cartridge 50 out of the casing. The lower casing member 30 is formed on a portion of an inner surface thereof opposite to the opening 22 of the upper casing member 10 with a roughened surface section 38 having an increased roughness as compared with the other portion of the inner surface. The roughened surface section 38 may be formed using a die of which a surface is subjected to an embossing or graining treatment. Alternatively, it may be formed by a post-treatment after molding of the lower casing member 30. The roughened surface section 38 is preferably formed so as to have a ten-point average roughness Rz of 5 $\mu$m to 15 $\mu$m as measured in accordance with JIS B 0601. The ten-point average roughness Rz below 5 $\mu$m fails to permit the roughened surface section 38 to exhibit a satisfactory advantage, whereas the ten-point average roughness Rz above 15 $\mu$m is apt to cause damage to the cartridge 50 during inserting of the cartridge 50 into the casing or taking out of the same therefrom.

In the cartridge receiving casing of the illustrated embodiment constructed as described above, when the cartridge 50 is received in the casing, the holders 18 are fittedly engaged with the recesses 52 of the cartridge 50, to thereby prevent it from falling off from the casing even when the casing is handled while keeping the access opening 40 facing down.

The cartridge 50 received in the casing may be taken out of the casing by forcing the cartridge 50 by a finger inserted through the opening 22 to slide it toward the access opening 40. More particularly, forcing of the cartridge 50 by a finger permits a lower surface of the cartridge 50 to be slid on the roughened surface section 38 of the lower casing member 30. Thus, the roughened surface section 38 significantly reduces friction between the cartridge 50 and the lower casing member 30, to thereby ensure that the cartridge 50 is smoothly taken out of the casing while being smoothly slid therein. Also, provision of the roughened surface section 38 minimizes abrasion of both an outer surface of the cartridge 50 and the inner surface of the casing due to friction therebetween.

Also, the illustrated embodiment permits a part of an outer periphery of the cartridge 50 to be exposed from the cutout 20 and 36, so that the cartridge 50 may be readily taken out of the casing while being interposedly held by fingers.

Figure 4:
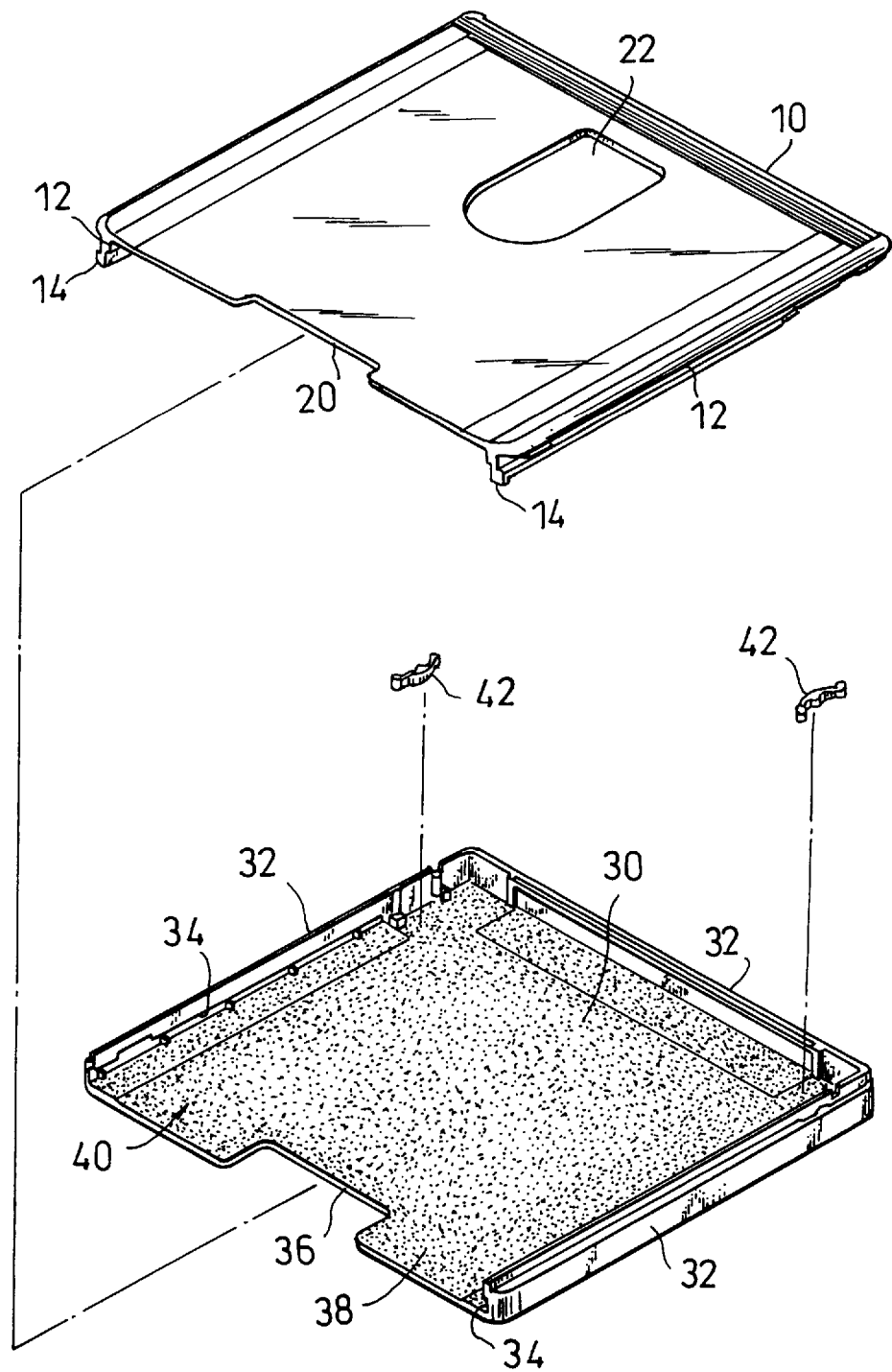
FIG. 4 is an exploded perspective view showing another embodiment of a cartridge receiving casing according to the present invention.

Referring now to FIG. 4, another embodiment of a cartridge receiving casing according to the present invention is illustrated. A cartridge receiving casing of the illustrated embodiment is constructed in such a manner that holders 42 for holding a cartridge 50 in the casing are formed separately from upper and lower casing members 10 and 30 and mounted on the lower casing member 30. Also, in the illustrated embodiment, a roughened surface section 38 is formed all over an inner bottom surface of the lower casing member 30. Such formation of the roughened surface section 38 permits a whole area of the inner bottom surface of the lower casing member 30 on which the cartridge 50 is slid to be reduced in friction, to thereby ensure smooth sliding of the cartridge in the casing as compared with the first embodiment described above.

The remaining part of the illustrated embodiment may be constructed in substantially the same manner as the embodiment described above.

In each of the embodiments described above, the opening 22 is provided at the upper casing member 10. Instead, it may be formed at the lower casing member 30. In this instance, the roughened surface section 38 is formed on an inner surface of the upper casing member 10.

In the present invention, the roughened surface section 38 is merely required to be formed at least in an area substantially equal to that of the opening 22 opposite thereto.

Also, in the present invention, the upper casing member 10 may be made of an opaque material rather than the above-described transparent resin material.

In the embodiments described above, an MD has been described as the cartridge by way of example. However, the cartridge is not limited to the MD. The present invention may be effectively applied to a casing for a disc cartridge including a disc-like medium such as an optical disc, a magneto-optical disc or a floppy disc or a tape cartridge including a tape-like medium such as a DAT or a digital compact cartridge (DCC).

The holders 18 may be formed integrally with the upper casing member 10 or lower casing member 30. Alternatively, they may be formed separately from the casing members 10 and 30 and mounted on one of the casing members 10 and 30.

The opening 22 may be of a size which permits a finger to enter the opening. Also, the opening 22 may be formed so as to extend toward or to the cutout 20.

As can be seen from the foregoing, the cartridge receiving casing of the present invention is so constructed that taking of the cartridge out of the casing is carried out while sliding the cartridge on the roughened surface section of the inner surface of the upper or lower casing member. Thus, the cartridge can be smoothly removed from the casing while minimizing abrasion of both the inner surface of the casing and the outer surface of the cartridge.

While preferred embodiments of the invention have been described with a certain degree of particularity with reference to the drawings, obvious modifications and variations are possible in light of the above teachings. It is therefore to be understood that within the scope of the appended claims, the invention may be practiced otherwise than as specifically described.

What is claimed is:

1. A cartridge receiving casing comprising:

an upper casing member and a lower casing member joined to each other, said upper and lower casing members being constructed so as to provide the casing with an access opening through which a cartridge is inserted into or taken out of the casing when said casing members are joined to each other; and holders for holding the cartridge in the casing once the cartridge is received therein;

one of said upper and lower casing members being formed with an opening through which an operation of taking the cartridge out of the casing is carried out;

the other of said upper and lower casing members being provided on at least a portion of an inner surface thereof opposite to said opening with a roughened surface section.

2. A cartridge receiving casing as defined in claim 1, wherein said opening is provided at said upper casing member.

3. A cartridge receiving casing as defined in claim 1, wherein said roughened surface section is provided all over an inner bottom surface of said lower casing member.

4. A cartridge receiving casing as defined in claim 2, wherein said roughened surface section is provided all over an inner bottom surface of said lower casing member.

5. A cartridge receiving casing as defined in claim 1, wherein said roughened surface section is formed with a ten-point average roughness of 5 to 15 μm as measured in accordance with JIS B 0601.

6. A cartridge receiving casing as defined in claim 2, wherein said roughened surface section is formed with a ten-point average roughness of 5 to 15 μm as measured in accordance with JIS B 0601.

7. A cartridge receiving casing as defined in claim 3, wherein said roughened surface section is formed with a ten-point average roughness of 5 to 15 μm as measured in accordance with JIS B 0601.

8. A cartridge receiving casing as defined in claim 4, wherein said roughened surface section is formed with a ten-point average roughness of 5 to 15 μm as measured in accordance with JIS B 0601.

9. A cartridge receiving casing as defined in claim 1, wherein said upper casing member is made of a transparent resin material.

10. A cartridge receiving casing as defined in claim 2, wherein said upper casing member is made of a transparent resin material.

11. A cartridge receiving casing as defined in claim 3, wherein said upper casing member is made of a transparent resin material.

12. A cartridge receiving casing as defined in claim 1, wherein said holders are each formed integrally with one of said upper and lower casing members.

13. A cartridge receiving casing as defined in claim 2, wherein said holders are each formed integrally with one of said upper and lower casing members.

14. A cartridge receiving casing as defined in claim 3, wherein said holders are each formed integrally with one of said upper and lower casing members.

15. A cartridge receiving casing as defined in claim 1, wherein said holders are each formed separately from said upper and lower casing members and mounted on one of said upper and lower casing members.

16. A cartridge receiving casing as defined in claim 2, wherein said holders are each formed separately from said upper and lower casing members and mounted on one of said upper and lower casing members.

17. A cartridge receiving casing as defined in claim 3, wherein said holders are each formed separately from said upper and lower casing members and mounted on one of said upper and lower casing members.

18. A cartridge receiving casing as defined in claim 1, wherein said opening is of a size which permits a finger to enter said opening.

19. A cartridge receiving casing as defined in claim 2, wherein said opening is of a size which permits a finger to enter said opening.

20. A cartridge receiving casing as defined in claim 3, wherein said opening is of a size which permits a finger to enter said opening.

21. A cartridge receiving casing as defined in claim 1, wherein said access opening is formed with cutouts to permit an outer periphery of the cartridge to be exposed therefrom.

* * * * *